United States Patent Office 3,504,072

Patented Mar. 31, 1970

3,504,072

METHOD OF PREPARING OPAQUE SHEET MATERIAL

Theodor Ploetz, Hosel, Kreis Mettmann, Germany, assignor to Feldmuhle Aktiengesellschaft, Dusseldorf, Germany No Drawing. Continuation of application Ser. No. 311,976, Sept. 27, 1963. This application Aug. 26, 1966, Ser. No. 575,931

Claims priority, application Germany, Sept. 28, 1962, F 37,911

Int. Cl. C08d *13/16;* B32b *31/12*

U.S. Cl. 264—112 9 Claims

ABSTRACT OF THE DISCLOSURE

Extremely light, but fully opaque writing or printing paper is produced by impregnating a light, porous, fibrous web with a solution of a synthetic resin in a low-boiling organic solvent containing enough of a less volatile, but still low-boiling non-solvent for the resin to cause precipitation of resin particles on and between the substrate fibers when the solvent is evaporated well below the fusion temperature of the resin, and the non-solvent is evaporated thereafter without fusing the resin. Self-supporting opaque films are similarly produced on an impervious substrate.

This application is a continuation of my copending application, Ser. No. 311,976, filed on Sept. 27, 1963, and now abandoned.

This invention relates to the manufacture of opaque sheet material capable of carrying printed or written indicia, and more particularly to the manufacture of sheet material having high opacity even when very thin.

The most common substrate for written or printed indicia is paper. When made very thin, as is desirable in airmail papers and for multiple carbon copies, paper becomes translucent or transparent, and indicia cannot be applied on more than one face thereof if legibility is to be maintained. Such translucency or transparency can be reduced only to a limited extent in papers having very small weight to area ratios, such as 20 to 25 grams per square meter.

Plastic films are readily prepared from synthetic organic resins in light gages in which their weight to area ratio at adequate mechanical strength is lower than that of the thinnest commercial papers, but such films or foils are fully transparent, and must be coated or colored on at least one face to make them suitable substrates for printed or written indicia. Such coated or colored plastic films or foils have a smooth, non-absorbent surface which does not readily retain printing or writing ink.

The principal object of the invention is the provision of a sheet material which is opaque in very thin layers so as to permit indicia to be applied on both faces thereof without interfering with legibility.

Another object is the provision of opaque, thin sheet material which accepts conventional inks, and may thus be printed upon by inexpensive methods on readily available equipment.

A further object is the provision of such sheet material at low cost.

I have found that solid particles of all commercial, organic, polymeric, synthetic resins constitute highly effective opaque white pigments when precipitated from their solutions in organic solvents by admixture of another organic liquid miscible with the solvent in which the resin is insoluble or only very sparingly soluble. The resin particles may be either employed to increase the opacity of a fibrous web produced by conventional papermaking operations, or they may be readily transformed into self-supporting sheets or films without losing opacity.

The invention, in its basic aspects, thus resides in a method in which a fluid solution of a solid organic polymeric synthetic resin in an organic solvent is mixed with another organic liquid miscible with the solvent. The other liquid is selected so that the resin is substantially insoluble therein, and it will be understood that such substantial insolubility includes a relationship of the liquid and the resin in which commercially insignificant amounts of the resin are dissolved by the liquid. The other organic liquid is admixed to the solution in sufficient amounts to cause precipitation of the resin from the resulting mixture. The precipitated resin is received on a supporting medium, and the solvent and precipitating liquid are evaporated from the precipitated resin while the same is supported on the medium. When the medium is a smooth plate, there is obtained an opaque layer of contiguously juxtaposed and superposed resin particles. When the medium is a fibrous web, it is impregnated with resin particles, and rendered opaque by them.

Other features and many of the attendant advantages of the invention will become apparent as the disclosure proceeds. The following examples illustrate typical embodiments of the invention, and it will be understood that the invention is not limited thereto.

EXAMPLE 1

13 grams polyvinyl chloride resin were digested at room temperature with an amount of a mixture of two parts acetone and one part isopropanol sufficient to dissolve the resin. The somewhat viscous solution obtained was poured on a clean glass plate on which it formed a liquid layer. The plate carrying the resin solution was placed in a drying oven the temperature of which was maintained at 80° C., and held in the oven until the isopropanol was completely evaporated, the acetone being driven off first.

When the plate was removed from the oven, it carried a thin white polyvinyl chloride foil which was readily stripped from the supporting glass plate. It had a weight of 15 grams per square meter, and a printing opacity of 92 to 94 percent.

EXAMPLE 2

A very loose dry web of cellulose fibers was impregnated with the solution of polyvinyl chloride in a mixture of acetone and isopropanol described in Example 1. The web originally had a weight of 12 grams per square meter. The impregnated web was dried at 80° C. in the aforedescribed oven.

The dried impregnated web was white and had a paper-like appearance, a weight of 23 grams per square meter, and a printing opacity of 92 to 94 percent.

Example 3

8.3 grams cellulose acetate (degree of substitution 2.4) were dissolved in 100 milliliters of a 2:1 mixture of acetone and isobutanol. The mixture was continuously charged at a uniform rate on a traveling endless steel band. The band was coated with polytetrafluoroethylene and was maintained at a temperature of 70° C. by means of attached electrical resistance heating elements.

The acetone was evaporated more rapidly than the isobutanol, and the cellulose acetate was thereby precipitated or coagulated in a zone spaced from the charging zone in the direction of band travel. A continuous layer of cellulose acetate was formed at the end of the precipitation zone. Air having a temperature of 75° C. was blown against the portion of the band following the precipitation zone in order to evaporate the residual solvent. The band then was cooled, and the cellulose film was continuously withdrawn.

The film had a weight of 18 grams per square meter, an opacity of 91%, and was suitable as a writing and printing medium.

Example 4

30 grams polystyrene were dissolved in 100 grams acetone, and 25 grams isobutanol were added to the solution. A thin layer of the solution was deposited on a highly polished copper plate heated to 75° C. After evaporation of the organic liquids, there was obtained a self-supporting foil having a weight of 8 grams per square meter and an opacity of 88%.

Example 5

20 grams of a copolymer of 80% vinyl chloride and 20% vinyl acetate were dissolved in 50 grams acetone. A suspension of 20 grams powdered chalk in 20 grams isobutanol was added with vigorous stirring. The mixture was poured on a glass plate, and the plate was passed through a tunnel oven. The first half of the oven was kept at 65° C., the remainder at 70° C.

A dry foil having a weight of 32 grams per square meter and an opacity of 93% was readily peeled from the glass plate after it had left the oven.

Example 6

A highly polished copper cylinder was slowly and continuously rotated about its horizontal axis. A 2.5% solution of polyethyl methacrylate resin in acetone was continuosly fed to a circumferential surface portion of the cylinder a few centimeters ahead of the highest part of the cylinder. A mixture of three parts gasoline and two parts oil of turpentine was continuously fed to that highest part at one third of the feeding rate of the resin solution.

The rotating cylinder was internally heated to 65° C. That portion of the cylinder surface on which the resin precipitated from the mixture of acetone, gasoline, and oil of turpentine to form an incipient foil was further heated by infrared radiation in such a manner that the foil reached a maximum temperature of 70° to 75° C. The rotary speed of the cylinder was adjusted in such a manner that a resin foil free from solvent could be withdrawn continuously from the cylinder surface at a point 270° from the resin solution feeding zone.

The foil weighed 8 grams per square meter and had an opacity of 86%. It was self-supporting and capable of being printed on commercial equipment.

It will be appreciated that an opacity of more than 90 percent cannot be achieved, even with the use of pigment, in conventional paper having a weight of the order of 20 grams per square meter, and the whiteness of the foil or paper-like web achieved by the method of the invention is not available in commercial paper unless relatively large amounts of high-grade pigments are incorporated therein.

It is believed that the opacity and whiteness of the foils or impregnated media of the invention is due to the dispersion of the resin in a multiplicity of fine particles formed by precipitation from the solution as the concentration of the nonsolvent in the mixture increases beyond the limit of compatibility. This change in the composition of the liquid phase may be brought about by either adding more of the non-solvent liquid component, or by preferentially removing the solvent component, as by drying at a temperature at which the rate of evaporation of the solvent is higher than that of the non-solvent coagulating, or precipitating liquid component. Although the precipitated particles sufficiently agglomerate to form a self-supporting foil or film when received on a glass plate or similar smooth medium, the multiplicity of free particle surfaces is believed to cause multiple light refraction, and to account for the high opacity of the films, and of fibrous webs impregnated or filled with the precipitated resin particles.

The method of the invention is not limited to any specific resin, but has been found applicable to a wide variety of resins which encompasses representative members of all classes of solvent soluble commercial resins including the fusible and soluble solid precursors and intermediates of thermosetting resins. The fact that all normally solid, soluble, synthetic resins are suitable for the method of the invention is believed due to the fact that all these resins are complex compounds which are largely amorphous and thus are precipitated from a solvent by a non-solvent in a physical state common to all such resins.

The following table lists additional resins which may be substituted for those mentioned in the illustrative examples, together with additional suitable solvent and precipitating components which are employed either as an initial mixture in which the resin may be dissolved, or which are mixed after the resin was dissolved in the solvent component.

TABLE

| Resin | Solvent | Precipitant |
|---|---|---|
| Cellulose acetate [1]<br>Cellulose propionate<br>Cellulose butyrate<br>Cellulose acetate-butyrate | Acetone, metylethyl ketone, ethyl acetate. | Isopropanol, butanol isobutanol, mixed aliphatic lowboiling hydrocarbons (benzine), toluene. |
| Nitrocellulose [2] | Acetone, methylethyl ketone, ethyl acetate. | Ethyl ether, benzine. methylene chloride. |
| Cellulose ethers: [3] | | |
| Methyl cellulose | Methylene chloride, ethanol. | Benzine. |
| Ethylcellulose [4] | Ethyl acetate, butyl acetate, acetone, benzene, toluene. | |
| Benzyl cellulose | Ethyl and butyl acetate, cyclohexanone, methylene chloride. | |
| Polyvinychloride [5] | Cyclohexanone, dioxane, tetrahydrofurane. | Benzine, benzene, toluene, ethanol, propanol, butanol, isobutanol. |
| Copolymers of vinyl chloride with: | | |
| Vinyl acetate [6] | Dioxane. | |
| Methyl acrylate and methacrylate. | Ethyl acetate, acetone, $CH_2$ $Cl_2$. | |
| Vinylidene chloride | Dioxane, cyclohexanone, tetrahydrofurane. | |
| Polyvinilidene chloride | Cyclohexanone, dioxane, tetrahydrofurane. | |
| Polystyrene | Ethyl acetate, acetone, benzene, toluene, methylene chloride. | Ethanol, propanol, iso-butanol, mineral oil. |
| Polyvinyl acetate | Acetone, dioxane, ethyl acetate. | Propanol, butanol, benzine, decahydronaphthalene. |
| Polymers of Methyl, ethyl, butyl acrylates and methacrylates, and their copolymers with acrylonitrile, styrene, vinyl chloride, vinyl acetate. | Benzene, toluene, ethyl acetate. | Ethanol, propanol, isobutanol. |
| Soluble phenol formaldehyde condensation products (novolak). | Ethanol, propanol, isobutanol, acetone. | Benzine, benzene, toluene. |
| Soluble and fusible urea and melamine-formaldehyde condensation products. | Ethanol, propanol, butanol, benzyl alcohol, dioxane, $CH_2Cl_2$. | Benzine, toluene, xylene. |

[1] 50–57% combined acetic acid (average acetylation 2.1 to 2.7 hydroxyl groups).

[2] 10.75 to 13.4 percent nitrogen (average nitration 1,9 to 2.7 hydroxyl groups).

[3] Average etherification 1.0 to 2,6 ,preferably more than two hydroxyl groups for better solubility in organic solvents.

[4] Ethoxy content 44 to 49 percent.

[5] Preferably post-chlorinated for better solubility.

[6] 2–15 percent polyvinyl acetate.

Further combinations of resin, solvent component, and precipitating component other than those listed in the table will readily suggest themselves to those skilled in the art. The solvent component and the precipitating component jointly employed are preferably liquids having different evaporation rates, that of the solvent component being higher. If the two components satisfy this requirement, the resin may initially be dissolved in an adequate amount of the mixture of both components, and the solvent component may be selectively or preferentially removed by evaporation from the mixture to precipitate the resin. Evaporation should be carried out at a temperature well below the fusion temperature of the resin to avoid complete coalescence of the resin particles which would make the material transparent in the thin layers with which this invention is mainly concerned. Evaporation at temperatures below 90° C. is safe with all soluble resins. It is not usually necessary to evaporate the organic liquids at a temperature outside the range of 50° to 80° C., and this range is preferred.

If so desired, mixtures of compatible or incompatible resins may be employed as film forming or impregnating materials in the method of the invention, and the mixtures may be produced in situ by simultaneously precipitating both resins from a common solvent by a common precipitant. Adjuvants such as plasticizers, stabilizers, pigments, and dyes may be incorporated in the sheet material formed from the mixture of solvent and precipitant in a conventional manner, not itself relevant to the method of the invention.

The sheet materials prepared according to the invention are characterized by the porosity of their surfaces. The interstices between the resin particles are adapted to retain ink or other indicia-forming materials. The inherently small size of the interstices prevents spreading of a properly formulated ink, and printed images produced on the sheet materials of the invention are sharp and well defined.

Self-supporting opaque resin films or foils of the invention may be prepared at weights as low as 10 grams per square meter. Such films may be imprinted on both faces without loss of legibility, and are thus eminently suitable for printed matter or letters intended to be transported by air. There is a two-fold saving in weight as compared to conventional airmail paper because of the smaller weight to area ratio, and because of the possibility of covering both faces of the film or foil with indicia. The low weight and high opacity make the films or foils of the invention a suitable and advantageous substitute for India paper. Obviously, the field of application of the sheet materials of the invention is not limited to very light weights. In layers of a weight greater than that referred to so far, the films of the invention have substantially greater opacity than otherwise comparable conventional sheets of paper and the like.

The impregnated fibrous webs of the invention share the advantages of the self-supporting films. The nature of the fibrous material in the web is not of particular importance as long as the web material does not interact with the solvent component and the precipitant component of the liquid mixture from which the resin is precipitated. Cellulose is insoluble in and generally unaffected by the solvents listed in the table, and is universally applicable to the method of the invention when performed with the resins and organic liquids listed.

Other fibrous materials suitable for combination with some or all the resins listed can obviously be employed. Glass fiber webs are fully resistant to all the organic solvents and precipitants. Synthetic fibers and natural fibers other than cellulose fibers are well known to resist many of these solvents and precipitants, so that such fibers may be employed as receiving media for selected resins. The bulk density of the web should preferably be between 0.4 and 0.6 gram per cubic centimeter prior to impregnation. Webs having a bulk density of less than 0.3 gram per cubic centimeter and adequate cohesion are not available at this time. Webs having a bulk density above 0.9 gram per cubic centimeter usually lack the desired porosity.

For a printable sheet material of extremely light weight, a loose absorbent web of cellulose fibers weighing as little as 10 grams per square meter is preferred. The cellulose fibers may be partly replaced by synthetic fibers in a well known manner if the mechanical strength and dimensional stability of the sheet material are intended to meet unusual requirements.

Obviously, many modifications and variations of the present invention are possible in the light of the above teachings.

What is claimed is:

1. A method of preparing an opaque sheet material capable of receiving ink indicia on both faces thereof which comprises:

(a) impregnating a porous fibrous web having a weight-to-area ratio of approximately 10 to 25 grams per square meter and a bulk density between 0.3 and 0.9 gram per cubic centimeter with a liquid mixture of an organic solvent, another organic liquid, and an organic polymeric synthetic resin,
  (1) said resin being soluble in said solvent and substantially insoluble in said other liquid, and
  (2) said other liquid being miscible with said solvent;

(b) preferentially removing an amount of said solvent from said liquid mixture,
  (1) said removed amount being sufficient to precipitate said resin from the remainder of said mixture, whereby the resin is deposited on said fibrous web and in the pores thereof; and (c) removing said remainder of said mixture from said web.

2. A method as set forth in claim 1, wherein said amount of solvent is removed from said mixture, and said remainder of the mixture is removed from said web by evaporation at a temperature lower than the fusion temperature of said resin, said resin being fusible and said solvent having a higher rate of evaporation at said lower temperature than said other liquid.

3. A method as set forth in claim 2, wherein said lower temperature is between 50° and 80° C.

4. A method as set forth in claim 3, wherein said web is insoluble in said solvent and in said other organic liquid.

5. A method as set forth in claim 3, wherein the amount of the precipitated resin is sufficient to constitute a layer of continuously arranged particles of said resin on the fibers of said web.

6. A method as set forth in claim 5, which further comprises applying ink indicia to both faces of the web carrying said layer of resin particles.

7. A method of preparing an opaque sheet material capable of receiving ink indicia on both faces thereof which comprises:

(a) coating an upwardly directed surface of a substantially impervious medium with a liquid mixture of an organic solvent, another organic liquid, and an organic polymeric synthetic resin,
  (1) said resin being soluble in said solvent and substantially insoluble in said other liquid, and
  (2) said other liquid being miscible with said solvent;

(b) preferentially removing an amount of said solvent from said liquid mixture,
  (1) said removed amount being sufficient to precipitate said resin from the remainder of said mixture, whereby the resin is deposited on said surface;

(c) removing said remainder of said mixture from said surface until the precipitated resin forms a continuous foil wherein the amount of said resin in said liquid mixture and the area of the coated surface are such that the weight of said foil is not substantially greater than 30 grams per square meter; and (d) withdrawing said foil from said surface.

8. A method as set forth in claim 7, wherein said solvent is removed from said mixture and said remainder of the mixture is removed from said surface by evaporation at a vaporizing temperature between 50° and 80° C., said resin being fusible and having a fusion temperature higher than 80° C., and said solvent having a higher rate of evaporation at said vaporizing temperature than said other organic liquid.

9. A method as set forth in claim 1, wherein said amount of said solvent and said remainder of said mixture are removed at respective temperatures lower than 80° C.

References Cited

UNITED STATES PATENTS

| | | | |
|---|---|---|---|
| 2,146,295 | 2/1939 | Herrmann | 264—204 |
| 2,783,894 | 3/1957 | Lovell et al. | 264—216 |
| 2,874,416 | 2/1959 | Burnett | 264—216 |
| 3,020,178 | 2/1962 | Sweeney et al. | 117—145 |
| 3,212,920 | 10/1965 | Chapman | 117—145 |
| 3,154,605 | 10/1964 | Meyer et al. | 264—216 |
| 3,208,875 | 9/1965 | Holden | 117—63 |

ROBERT F. WHITE, Primary Examiner

JEFFERY R. THURLOW, Assistant Examiner

U.S. Cl. X.R.

106—177; 117—145, 155; 162—135, 184; 260—33.4; 264—204, 216